Oct. 20, 1931.    W. S. ATTA    1,828,166

CURTAIN OPERATING DEVICE FOR AUTOMOBILES AND THE LIKE

Filed Jan. 20, 1931

Inventor
William S. Atta
By Rockwell & Bartholow
Attorneys

Patented Oct. 20, 1931

1,828,166

UNITED STATES PATENT OFFICE

WILLIAM S. ATTA, OF WATERBURY, CONNECTICUT

CURTAIN OPERATING DEVICE FOR AUTOMOBILES AND THE LIKE

Application filed January 20, 1931. Serial No. 509,915.

This invention relates to curtain or shade operating devices for window shades and particularly for use in connection with the shades or curtains upon automobile windows.

The driver of an automobile often experience considerable annoyance from the headlights of following cars, the beams of light from which enter through the rear window of the vehicle and are reflected into the driver's eyes by the rear view mirror. There is usually provided upon cars no way of controlling the curtain or shade of the rear window from the front seat of the car, and it is, therefore, necessary for the driver either to have some one in the rear seat draw the shade, or, if no one is in the rear seat, he must stop the vehicle in order to do it himself.

One object of this invention is the provision of means for operating the window shade of an automobile at a point within easy and convenient reach of the driver.

Another object of the invention is the provision of a manually operated device within reach of the driver of an automobile for raising and lowering the shades of the rear window of the car at will.

A still further object of the invention is the provision of means attached to the steering post, the dash, or other portion of an automobile within reach of the driver's seat, of a device by which the driver may draw the shade upon the rear window of the car, the arrangement being such that the shade will be held in any position to which it is adjusted and will be permitted to return to its raised position at the will of the driver.

More specifically the invention resides in mounting upon a part of an automobile within easy reach of the driver thereof, a device for drawing the rear shade of an automobile, the device being provided with means by which it may readily be released to permit the shade to be returned to its original position by its spring.

To these and other ends, the invention consists in the novel features and combinations of parts to be hereinafter described and claimed.

Figure 1:
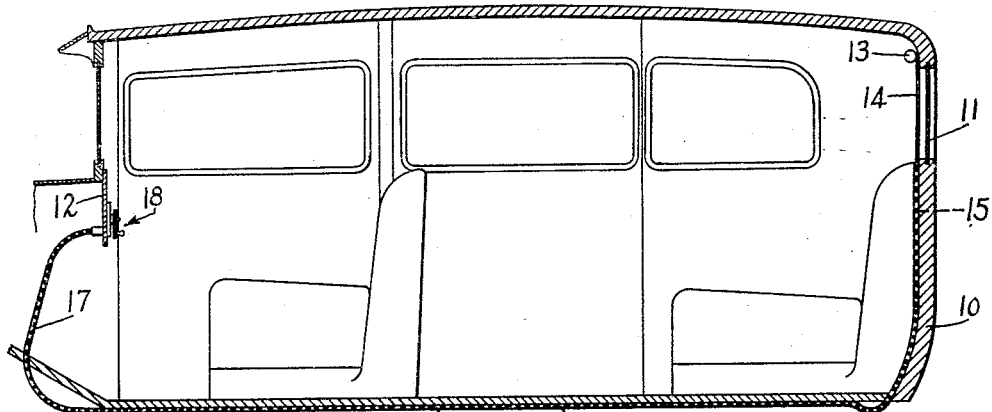
Fig. 1 is a sectional view of an automobile body provided with an embodiment of my invention.
Figure 2:
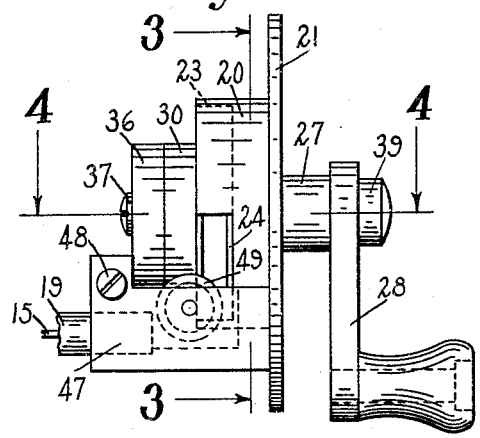
Fig. 2 is an elevational view of the shade operating device.

To illustrate a preferred embodiment of my invention, I have shown an automobile body 10 provided as usual with a rear window 11, and a dash or instrument board 12. Mounted above the rear window is a shade roller 13 carrying thereon the usual shade 14. Secured in this instance to the lower end of the shade is a cord or flexible wire 15 which, as shown, passes downwardly behind the back of the rear seat and then forwardly under the body of the car, as shown at 16, and then upwardly, as shown at 17, to be secured to the operating device designated generally by the numeral 18. As illustrated, this cord is enclosed within the tubing 19, but it may, of course, be trained about pulleys or guided in any other suitable manner between its ends so that it will be carried from the rear of the automobile to the instrument board without interfering with other parts of the vehicle.

The operating device 18 comprises a body portion 20 provided with an annular flange or plate 21 provided with bolt or screw openings 22 by which it may be secured to the instrument board. The body 20 is recessed at 23 to receive freely therewithin a pulley 24. The wire or cord 17 is designed to be trained about the pulley and to have its ends secured thereto by means of the screw 25 so that, when the pulley is rotated, the cord will be wound within the groove 26 in the periphery of the pulley.

The body 20 is provided with a central opening or bore within which is mounted a sleeve 27 carrying an operating handle 28. The sleeve is provided with a shoulder 29 which abuts against the exterior face of the body 20 and at its inner end a nut 30 is threadedly secured upon the sleeve to hold the latter in place. It will be understood, of course, that this sleeve is rotatably mounted within the body 20 and, as shown in Fig. 4, the face of the nut abuts the face of the pulley.

It is desirable to provide means for clutching the pulley to the sleeve 27 when it is desired to draw the shade and to release the pulley therefrom so that the shade will be permitted at the will of the operator to assume its original position. To this end, as shown in Fig. 5, the face of the pulley is provided with an annular recess 32 within which are a number of pins or stops 33, there being four of such stops in the embodiment of the invention illustrated. The nut 30 is provided with two openings 34 opposite the recess 33, and passing through these openings are the extended ends of pins 35 which are secured to a clutch plate 36. The clutch plate 36 is secured by means of a screw 37 upon the end of a plunger 38 mounted within the sleeve 27 and provided upon its end opposite the clutch plate with a pushbutton 39. A spring 40 surrounds the plunger 38 within the sleeve 27 and re-acts against the pushbutton 39 to normally urge the plunger outwardly or to the right, as shown in Fig. 4, so as to maintain the clutch plate against the nut 30, as shown in this figure.

Figure 4:
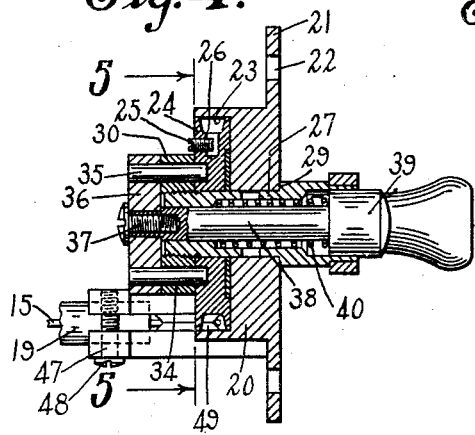
Fig. 4 is a sectional view on line 4—4 of Fig. 2.
Figure 5:
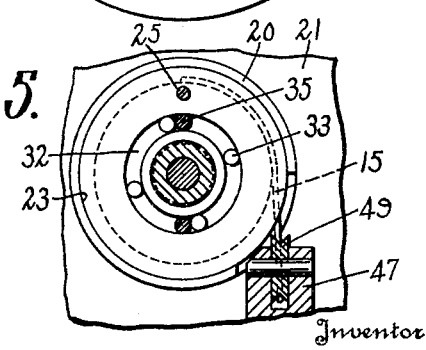
Fig. 5 is a sectional view on line 5—5 of Fig. 4.

It will be apparent that when the pushbutton 39 is pressed inwardly or to the left in Fig. 4, the clutch plate 36 will be moved to the left and withdraw the ends of the pins 35 from the recess 32 so that these pins will no longer engage against the stops 33 and the pulley will be freed from engagement with the nut 30 and handle 28 and may therefore revolve freely.

Figure 3:
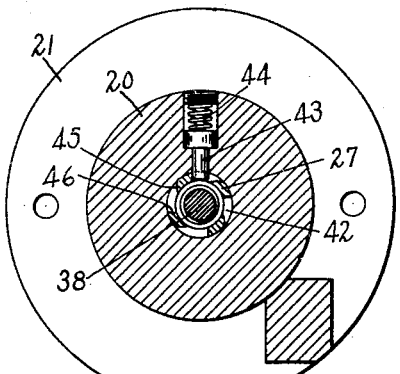
Fig. 3 is a sectional view on line 3—3 of Fig. 2.

In order that the shade may be retained in any position to which it is drawn, the sleeve 27 is provided with openings 42, as shown particularly in Fig. 3, with which engages a pin 43 urged inwardly by its spring 44, this pin being mounted in a properly shaped opening in the body 20. As will be observed from reference to Fig. 3, one of the side edges of each of the openings 42 is beveled, as shown at 45, while the other edge 46 is abrupt. With this arrangement the sleeve 27 may be turned freely in a direction to wind the cord or wire 17 upon the pulley, the pin 43 riding successively out of each of the openings 42 over the beveled edge 45. When, however, the handle 28 is released, the pin 43 will lodge against the abrupt edge 46 of one of the openings 42 and prevent the turning of the sleeve 27 in a reverse direction.

The body 20 is also provided with a clamp 47 designed to receive the end of the tube 19 about the wire 15, the tube being secured in place by the clamping screw 48. A sheave 49 is also provided in the members of the clamp so that the wire 17 may be trained about this sheave and led therefrom upon the pulley 24.

The operation of my device is as follows. It will be understood, of course, that the shade roller 13 will be provided with the usual spring which tends to turn the roller in a direction to wind the shade thereon. As the usual shade roller is provided with dogs to prevent such movement, I prefer to remove these dogs so that the shade roller will, when permitted, turn freely to wind the shade thereon under the control of its spring.

If the driver wishes to draw the shade over the window 11, he has merely to turn the crank or handle 28, which, through the nut 30, clutch plate 36 and pins 35 (the latter engaging the stops 33), will turn the pulley 24 in a direction to wind the cable 15 thereon and draw the shade downwardly over the window. During this movement the pin or plunger 43 will ride successively over the beveled faces 45 so as not to interfere with the turning of the sleeve 27. When the shade is drawn downwardly to the desired extent, and the motion of the crank handle 28 ceases, the pin 43 will drop into one of the openings 42 thus preventing the return rotation of the pulley and will hold the shade in the adjusted position against the tension of the spring in the shade roller.

When it is desired to raise the shade, the operator pushes the button 39 inwardly to unclutch the pulley 24 from the nut 30. The movement of the plunger 38 by pressure on the push button 39 pushes the clutch plate 36 to the left and withdraws the pins 35 from the recess 32 so that they no longer engage the stops 33. The pulley is then released so that it may turn freely and the shade will be wound up upon its roller by the action of the usual shade roller spring.

It will be apparent that I have provided an exceedingly simple and efficient device for the control of the shade of the rear window, and a device whereby the shade may be drawn to any desired position and will be automatically held in such position until released. Moreover when in any adjusted position it may either be released or drawn downwardly to a further extent as desired. When it is desired to return the shade to its original position, the operator need only press upon the button 39 and the shade will be automatically wound upon its roller.

In the embodiment shown, the device is mounted upon the instrument board, but it will be understood that it may, if desired, be mounted upon the steering wheel or any other part of the car within convenient reach of the driver.

While I have shown and described a preferred embodiment of my invention, it will be understood that it is not to be limited to all of the details shown, but is capable of modification and variation within the spirit of the invention and within the scope of the appended claims.

What I claim is:

1. In an automobile having a shade roller and a shade thereon, a tension member secured to said shade, an operating device adjacent the driver's seat of the automobile, said operating device comprising a pulley upon which the tension member is wound, a rotatable shaft, and means connecting said pulley to the shaft for rotation therewith and to disconnect the pulley therefrom for rotation relatively to the shaft, and means preventing reverse rotation of the pulley when it is connected to the shaft.

2. In an automobile having a shade roller and a shade thereon, a tension member secured to said shade, an operating device adjacent the driver's seat of the automobile, said operating device comprising a pulley upon which the tension member is wound, a rotatable shaft, and means connecting said pulley to the shaft for rotation therewith and to disconnect the pulley therefrom for rotation relatively to the shaft, and means to permit rotation of the shaft in one direction, but preventing rotation thereof in the opposite direction.

3. In an operating device for the curtains of automobiles, a body member, a shaft rotatably mounted therein, a pulley freely mounted on said shaft, a clutch to connect and disconnect the pulley from the shaft and a push rod to operate the clutch.

4. In an operating device for the curtains of automobiles, a body member, a shaft rotatably mounted therein, a pulley freely mounted on said shaft, a clutch to connect and disconnect the pulley from the shaft and a push rod to operate the clutch, said shaft being hollow and said push rod being mounted therein.

5. In an operating device for the curtains of automobiles, a body member, a shaft rotatably mounted therein, a pulley freely mounted on said shaft, a clutch to connect and disconnect the pulley from the shaft and a push rod to operate the clutch, said shaft being hollow and said push rod being mounted therein, and a spring normally urging said rod in a direction to engage the clutch.

6. In a device for operating an automobile curtain, a supporting body member adapted to be secured to a part of an automobile adjacent the driver's seat, a shaft rotatably mounted in said body, a pulley carried by the body and having a tension member wound thereon and connected to the shade, means connecting said pulley to the shaft for rotation therewith, means for rotating the shaft to wind the pulley thereon, means for preventing reverse rotation of said shaft, and means for disconnecting the pulley from the shaft to permit the latter to rotate freely in a direction to unwind the tension member.

7. In a device for operating an automobile curtain, a supporting body member adapted to be secured to a part of an automobile adjacent the driver's seat, a shaft rotatably mounted in said body, a pulley carried by the body and having a tension member wound thereon and connected to the shade, means connecting said pulley to the shaft for rotation therewith, means for rotating the shaft to wind the pulley thereon, means for preventing reverse rotation of said shaft, and means for disconnecting the pulley from the shaft to permit the latter to rotate freely in a direction to unwind the tension member, said means for preventing reverse rotation of the shaft comprising an opening in the shaft and a spring-pressed plunger mounted in the body and urged into said opening.

8. In a device for operating an automobile curtain, a body member, a shaft rotatably mounted therein, a pulley carried by the body member and adapted to be rotated by said shaft, means permitting rotation of said shaft in one direction only, and means to permit reverse rotation of the pulley independently of the shaft.

9. In a device for operating an automobile curtain, a body member, a shaft rotatably mounted therein, a pulley carried by the body member and adapted to be rotated by said shaft, means permitting rotation of said shaft in one direction only, and means to permit reverse rotation of the pulley independently of the shaft, and a tension member adapted to be wound on said pulley and connected with the curtain.

10. In an automobile having a shade roller and a shade thereon, a tension member secured to said roller and extending to a point adjacent the driver's seat, an operating device secured to the car in a position to be easily accessible from the driver's seat, said device comprising a body member and a pulley carried thereby upon which the tension member is adapted to be wound, manually rotatable means connected to said pulley to turn the same to wind the cable thereon, and a pressure operated member to break said connection to permit the pulley to rotate freely in a reversed direction, and means preventing rotation of said manually operable member in one direction.

In witness whereof, I have hereunto set my hand this 13th day of January, 1931.

WM. S. ATTA.